United States Patent [19]

Chen

[11] Patent Number: 5,738,795
[45] Date of Patent: Apr. 14, 1998

[54] COMPOSITIONS AND METHODS FOR WATER CLARIFICATION

[75] Inventor: Jen-Chi Chen, Morrisville, Pa.

[73] Assignee: BetzDearborn Inc., Trevose, Pa.

[21] Appl. No.: 665,139

[22] Filed: Jun. 14, 1996

[51] Int. Cl.$^6$ ........................................ C02F 1/52
[52] U.S. Cl. .................. 210/730; 210/734; 210/917; 252/358; 536/3; 536/123.1
[58] Field of Search .................. 252/358, 315.3; 536/3, 123.1; 210/702, 708, 704, 705, 917, 730, 734; 106/501.1

[56] References Cited

U.S. PATENT DOCUMENTS

| | | | |
|---|---|---|---|
| 3,332,933 | 7/1967 | Schweiger | 536/3 |
| 3,376,282 | 4/1968 | Schweiger | 536/3 |
| 3,823,100 | 7/1974 | Rothwell et al. | 536/3 |
| 4,501,834 | 2/1985 | Su | 524/28 |
| 4,528,111 | 7/1985 | Su | 424/73 |
| 4,612,268 | 9/1986 | Miura et al. | 430/28 |
| 4,721,760 | 1/1988 | Graafland | 536/238.23 |
| 4,758,282 | 7/1988 | Stober et al. | 536/114 |
| 4,876,034 | 10/1989 | Hirota et al. | 510/405 |
| 4,956,104 | 9/1990 | Cowan et al. | 507/211 |
| 4,990,270 | 2/1991 | Meister | 507/210 |
| 5,045,593 | 9/1991 | Cowan et al. | 525/54.3 |
| 5,112,903 | 5/1992 | Sakakibara et al. | 525/54.2 |
| 5,416,174 | 5/1995 | Shimizu et al. | 526/62 |
| 5,431,783 | 7/1995 | Honig | 162/164.1 |
| 5,478,477 | 12/1995 | Ramesh et al. | 210/730 |
| 5,492,982 | 2/1996 | Shimizu et al. | 526/62 |
| 5,512,277 | 4/1996 | Uemura et al. | 427/78.03 |
| 5,583,193 | 12/1996 | Aravindakshan et al. | 527/300 |

OTHER PUBLICATIONS

Betz Handbook of Industrial Water Conditioning, Ninth Edition, 1991, pp. 23-30, Betz Laboratories, Inc., Trevose PA.

"Secondary and Tertiary Structure of Polysaccharides in Solutions and Gels," Rees and Welsh, Agnew. Chem. Int. Ed. Engl. 16, 214-224(1977).

Roy L. Whistler, Industrial Gums Polysaccharides and their Derivatives, (Academic Press, NY, NY, 1973) p. 74, copyright 1973.

*Primary Examiner*—Richard D. Lovering
*Assistant Examiner*—Daniel S. Metzmaier
*Attorney, Agent, or Firm*—Alexander D. Ricci; Philip H. Von Neida

[57] ABSTRACT

Copolymers of low molecular weight polysaccharides and cationic monomers, their method of production and method of using as water treatment agents are disclosed. Preferably the copolymer comprises alginic acid and methyl chloride quaternary salt of dimethylaminoethyl acrylate.

14 Claims, No Drawings

COMPOSITIONS AND METHODS FOR WATER CLARIFICATION

FIELD OF THE INVENTION

The present invention relates to compositions and methods for water clarification. More particularly, the present invention relates to compositions comprising a copolymer of a low molecular weight polysaccharide and a cationic monomer and methods for reducing turbidity and color of water.

BACKGROUND OF THE INVENTION

Raw water such as water from rivers, lakes or underground usually contains suspended matter. The suspended matter must be removed by clarification in order to provide water suitable for use in domestic and industrial applications. The suspended matter can consist of large solids, settleable by gravity alone without any external aid, and nonsetteable matter which is often colloidal in nature. Removal of the suspended material is generally accomplished by coagulation, flocculation, and sedimentation. Together, these processes are referred to as conventional clarification (see Betz Handbook of Industrial Water Conditioning, 9th Edition, 1991, Betz Laboratories, Inc., Trevose, Pa., pages 23 through 30).

Naturally occurring suspended particles are predominantly negatively charged. Water soluble organic polymers, such as polyamine and polydimethyldiallyl ammonium chloride, are normally used to clarify water having high turbidity; typically greater than 60 NTU (nephelometric turbidity units). In low turbidity waters less than 60 NTU, there are generally not enough particulates to form a settleable floc when the water is treated with cationic polymers alone.

Inorganic coagulants such as aluminum sulfate, polyammonium chloride, ferric sulfate, ferric chloride and sodium aluminate are often used in these low turbidity waters. These inorganic coagulants are relatively inexpensive and generally effective for water clarification. However, they tend to generate voluminous sludge which is difficult to dewater. Also, such inorganic coagulants are only effective within a particular pH range and therefor require proper pH adjustment of the water during treatment. In addition, residual iron and aluminum ions in the water may affect downstream operations such as cooling and boiler treatments and may also cause health and environmental concerns when the water is finally discharged.

Water soluble/dispersible melamine formaldehyde resins have been used for clarification of low turbidity waters, but the residual formaldehyde in the resin can give rise to handling and disposal difficulties. The present concerns over formaldehyde in water systems makes an aldehyde-free treatment very desirable and it is an object of the present invention to provide an effective method of clarifying water without incurring the disadvantages of inorganic coagulants and formaldehyde-containing resins.

SUMMARY OF THE INVENTION

The present invention provides for a composition, a method of preparing said composition, and methods for reducing turbidity and color in aqueous systems. The composition comprises a copolymer of a low molecular weight polysaccharide and a cationic monomer.

DESCRIPTION OF THE RELATED ART

U.S. Pat. No. 4,956,104 teaches organophilic polymer adducts which are useful as oil base well-working fluids. The organophilic polymer adducts are preferably prepared from polymers such as polysaccharides and derivatives thereof and synthetic anionic or cationic polymers and one or more phosphatide compounds. The organophilic polymers are produced by bringing together the water soluble polymer and the phosphatide in either their acid or base forms. The organophilic portion of the phosphatide sorbs onto the surface of the polymeric material to form the organophilic polymer material. There is no teaching in '104 to polymerize the polysaccharide and a cationic monomer together.

U.S. Pat. No. 5,401,834 teaches the formation of water soluble and water insoluble gels by interpolymer reactions of selective anionic polymers which includes alginic acid with selective cationic polymers in an aqueous medium. The water soluble and water insoluble swellable interpolymer gels comprise the reaction product formed by the rapid and intensive interaction of the two oppositely charged selected polymers. Essential to the formation of these interpolymer gels are the speed of mixing of the polymers and their concentration. The resultant polyelectrolyte complex should be in the form of a clear gel that is free of precipitates.

U.S. Pat. No. 4,990,270 discloses a thickening agent used for enhanced oil recovery by graft polymerizing of acrylamide and cationic monomer with water insoluble lignin in a calcium chloride/dimethylsulfoxide solution. The procedure is rather involved and requires precipitation and filtration in acetone and further dialysis to isolate the product.

DETAILED DESCRIPTION OF THE INVENTION

The present invention relates to a water soluble or dispersible polymer composition comprising a low molecular weight polysaccharide and a cationic monomer. The present invention also provides for methods for preparing the aforesaid polymer and methods for reducing the turbidity and color of aqueous systems.

For purposes of the present invention, low molecular weight polysaccharides refers to a polysaccharide having a molecular weight of about 50,000 to about 500,000. Representative low molecular weight polysaccharides useful in the present invention are selected from the group consisting of but not limited to alginic acid, sodium alginate, hyaluronic acid, sodium hyaluronate, sodium chondroitin sulfate, sodium carboxymethyl cellulose, and sodium carboxymethylamylose.

Alginic acid is a hydrophilic, colloidal polysaccharide obtained from seaweeds. It has the formula $(C_6H_8O_6)_n$ and typically has a molecular weight ranging from about 50,000 to about 250,000. Alginic acid is a linear polymer of $\beta$-(1-4)-D-mannosyluronic acid and $\alpha$-(1-4)-L-gulosyluronic acid residues, the relative proportions of which vary with the botanical source and state of maturation of the plant. For a review of structure studies, see D. A. Rees, E. J. Welsh, Angew. Chem. Int. Ed. 16, 214 (1977).

The cationic monomer may be selected from the group containing ethylenically unsaturated quaternized or protonated ammonium, phosphonium or sulfonium ions. Cationic monomers that may be selected from this group include but are not limited to quaternized or protonated ammonium salts of dialkylaminoalkyl (meth)acrylamides, dialkylaminoalkyl (meth)acrylates, and diallyl dialkyl ammonium chloride.

Preferred cationic monomers that are useful in the present invention include but are not limited to methyl chloride or dimethyl sulfate quaternary salts of dimethylaminoethyl acrylate, diethylaminoethyl acrylate, dimethylaminopropyl methacrylamide, dimethylaminopropyl acrylamide, diallyldimethyl ammonium chloride, diallyl diethyl ammonium chloride, and HCl salts of dimethylaminoethyl acrylate, diethylaminopropyl acrylamide and dimethylaminopropyl acrylamide.

In another embodiment of the present invention, the low molecular weight polysaccharide can be reacted with the cationic monomer and optionally either a nonionic monomer or an anionic monomer or both. As such, the composition can further comprise a copolymer of low molecular weight polysaccharide, cationic monomer and nonionic monomer, or low molecular weight polysaccharide, cationic monomer and anionic monomer, or low molecular weight polysaccharide, cationic monomer, nonionic monomer, and anionic monomer.

Preferred nonionic monomers that are useful in this embodiment of the invention include but are not limited to acrylamide, methacrylamide, N-methylolacrylamide, N,N-dimethylacrylamide and lower alkyl ($C_1$ to $C_6$) esters or hydroxylated lower alkyl ($C_1$ to $C_6$) esters selected from the group consisting of vinyl acetate, methyl acrylate, ethyl acrylate, methyl methacrylate, hydroxyethyl acrylate, hydroxypropyl acrylate and hydroxyethyl methacrylate; ethoxylated alkyl or aryl acrylates; and allyl glycidyl ether.

The anionic monomer is generally selected those monomers containing ethylenically unsaturated carboxylic or sulfonic acid functional groups. Preferred anionic monomers useful in this embodiment of the invention include but are not limited to acrylic acid, methacrylic acid, vinyl acetic acid, allylacetic acid, styrene sulfonic acid, 2-acrylamido-2-methyl propane sulfonic acid (AMPS®, a registered trademark of the Lubrizol Corporation), and 3-allyloxy-2-hydroxypropanesulfonic acid and their salts. Mixtures of carboxylic and sulfonic monomers and their salts are also within the purview of this invention.

The copolymer of low molecular weight polysaccharide and cationic monomer generally has from about 50 to about 99 weight percent of cationic monomer present. Preferably from about 90 to about 95 weight percent of cationic monomer is present in the copolymer.

When the nonionic monomer and/or anionic monomer are reacted with the low molecular weight polysaccharide and cationic monomer, the resulting polymer can contain, by weight percent, about 1 to 50 percent low molecular weight polysaccharide, about 0 to 40 percent nonionic monomer and about 0 to 30 percent anionic monomer with the remainder being cationic monomer. Preferably the cationic monomer content is higher than the anionic monomer content when those monomers are reacted with the low molecular weight polysaccharide.

The number average molecular weight of the polymer is not critical as long as the resulting polymer is water soluble or dispersible. The inventive polymers may be prepared by mixing the desired monomers with the low molecular weight polysaccharide and initiating by a free radical initiator via solution, precipitation or emulsion polymerization techniques. Conventional initiators such as azo compounds, persulfates, peroxides, redox couples, cerium salts, UV light, etc., may be used in the polymerization reaction. The preferred initiators include but are not limited to 2,2'azobis (2-amidinopropane) dihydrochloride, available as V-50 from Wako Chemicals and the t-butylhydroperoxide/sodium metabisulfite (t-BHP/NaMBS) system. These or other initiators may be added at the end of polymerization to further react with any residual monomers.

Chain transfer agents such as alcohols, amine, formic acid or mercapto compounds may be used to regulate the molecular weight of the polymer. The resulting polymer may be isolated by well-known techniques including precipitation, etc., or if polymerized in water, the polymer may be used in its aqueous solution.

The polymerization reaction temperature is not critical and can range between 10° and 100° C. with a range of 40° to 70° C. preferred. The pH of the reaction mixture is not critical and is generally in the range of about 5.0 to 9.0. The resulting polymers may be characterized by C-13 NMR, Brookfield viscosity and percent solids.

It is to be understood that the above methods of synthesis of the polymer do not limit the methods of preparation of the copolymers and polymers of the present invention.

The resulting low molecular weight polysaccharide containing polymers are added to the aqueous system to be treated in an amount sufficient for its intended purpose. For purposes of the present invention, the term "an effective amount" may be defined as that amount which will perform the designated purpose. This amount will of course vary depending upon the particular aqueous system for which treatment is desired and can be influenced by variables such as turbidity, pH, temperature, water quantity, and types of contaminants present in the system. The inventive polymers are effective at a wide range of pHs and should prove effective at the pH of any aqueous system for which water treatment is sought.

The low molecular weight polysaccharide containing polymers of the present invention prove effective in a variety of aqueous systems suffering from different contaminants but are well suited to the reduction of turbidity, color and the clarification of aqueous systems such as influent waters and wastewater systems. Clay, silt, finely divided organic and inorganic matter, and microscopic organisms can all contribute to turbidity. Color is most often colloidal in nature and results from organic materials such as humic acids and other compounds leached from vegetative matter.

The inventive polymers can be added to the aqueous system where water clarification is sought in amounts ranging from about 0.1 parts to about 100 parts per million parts of water. The polymers may b added to the system neat or in an aqueous solution either continuously or intermittently.

Polymeric flocculants such as polyacrylamide and copolymers of acrylamide with acrylic acid and other coagulants such as alum, ferric chloride, clays, zeolites, activated carbon and the like may be used in conjunction with the inventive polymers to reduce turbidity and color and to improve clarity.

Those skilled in the art will recognize the many applications in which the inventive polymers will find utility. These utilities include, but are not limited to, wastewater treatment applications such as wastewater from chemical plants, refineries and pulp and paper mills; influent water clarification, color reduction, secondary water clarification, oily wastewater, proteinaceous containing wastewater, papermaking such as retention and drainage aids, protein recovery, emulsion breaking, sludge dewatering, upflow filter clarification, horizontal flow clarification, and the like.

In order to more clearly illustrate this invention, the data set forth below were developed. The following examples are included as illustrations of the invention and should not be construed as limiting the scope thereof.

EXAMPLES

Preparation of low molecular weight polysaccharide-containing copolymers.

Example 1

A reaction flask equipped with a condenser, a thermometer, a nitrogen inlet and a mechanical stirrer was charged with 5.33 g of alginic acid, 165.00 g of deionized water, 1.91 g of caustic (50% sodium hydroxide solution), and 12.00 g of methyl chloride quaternary salt of dimethylaminoethyl acrylate (AETAC)(80%). An initiator solution containing 0.67 g of V-50 in 3.00 g of deionized water was then added to the system at 60° C. A monomer solution containing 48.00 g of AETAC (80%) was then gradually added to the flask in one and one-half hours. After that, the polymerization was continued for four and one-half hours. The structure of the resulting polymer was verified by C-13 NMR. The polymer solution had a Brookfield viscosity of 29 cps at 21.9% solids (25° C.).

Example 2

Using the apparatus as described in Example 1, 2.53 g of alginic acid, 139.00 g of deionized water, 0.91 g of caustic (50% sodium hydroxide in water), and 12.00 g of AETAC (80%)were charged to the reaction flask. An initiator solution containing 0.67 g of V-50 in 3.00 g of deionized water was then added to the system at 60° C. A monomer solution containing 48.00 g of AETAC (80%) was then gradually added to the flask in one and one-half hours. After that, the polymerization was continued for four and one-half hours. The structure of the resulting polymer was verified by C-13 NMR. The polymer solution had a Brookfield viscosity of 36 cps at 25.9% solids (25° C.).

Example 3

Using the apparatus as described in Example 1, 1.98 g of alginic acid, 62.53 g of deionized water, and 0.54 g of caustic (50% sodium hydroxide in water), were charged to the reaction flask. An initiator solution containing 0.61 g of V-50 in 3.75 g of deionized water was then added to the system at 60° C. A monomer solution containing 19.80 g of dimethylaminopropyl methacrylamide (DMAPMAM), 11.25 g of deionized water, and 11.49 g of concentrated hydrochloric acid (37%) was then gradually added to the flask in three hours. After that, the polymerization was continued for four hours. The structure of the resulting polymer was verified by C-13 NMR. The polymer solution had a Brookfield viscosity of 206 cps at 24.4% solids (25° C.).

Example 4

Using the apparatus, procedure, and reagent charge as described in Example 2, the feed time of AETAC (80%) was two hours instead of one and one-half hours. The resulting polymer solution had a Brookfield viscosity of 22 cps at 25.9% solids (25° C.).

Table I summarizes the composition and physical properties of the inventive polymers prepared by the above described methods.

TABLE I

| Example | Composition | Weight Ratio | % Solids | pH | Viscosity |
|---|---|---|---|---|---|
| 1 | Alginic acid/AETAC | 10/90 | 21.9 | 3.9 | 29 |
| 2 | Alginic acid/AETAC | 5/95 | 25.9 | 4.0 | 36 |
| 3 | Alginic acid/DMAPMAM | 10/90 | 24.4 | 7.4 | 206 |
| 4 | Alginic acid/AETAC | 10/90 | 25.9 | 3.8 | 22 |

Alginic acid is hydrophilic colloidal polysaccharide obtained from seaweeds.
AETAC is methyl chloride quaternary salt of dimethylaminoethyl acrylate
DMAPMAM is dimethylaminopropyl methacrylamide Efficacy Tests In order to demonstrate the efficacy of the inventive polymers for removing turbidity, water clarification tests were connected using synthetic river water and Catawba river water as test substrates.

The synthetic river water substrate contained deionized water, reagent grade chemicals and naturally occurring clays and humic acid. Table II demonstrates the substrates' compositions which were prepared to approximate a typical low-medium turbidity river water.

TABLE II

| Substrate | I | II | III | IV |
|---|---|---|---|---|
| Turbidity (NTU) | 7 | 15 | 90 | 3.5 |
| True color (pt-co color units) | 53 | 308 | 225 | 18 |
| pH | 7.8 | 7.8 | 7.2 | 6.9 |

Test water substrates Physical Characteristics

Substrates I, II and III are synthetic river water
Substrate IV is Catawba River water Test Procedure The procedure used was a standard jar test designed to simulate the operation of a typical water treatment clarifier. For single component treatments, the test procedure consists of: adding the polymer treatment to the test substrate at various dosages, mixing the treated substrate for 20 minutes, allowing 15 minutes settling time for the solids formed in the treated water to settle, and measuring the residual turbidity of the supernatant water produced by each treatment. A Hach Model 2100P or 18900 Ratio Turbidimeter was used for the measurement of turbidity. The results of this testing are reported in Tables III, IV, V and VI.

TABLE III

Residual Turbidity Test Water Substrate I
Synthetic river water, turbidity = 7 NTU

| Example | Dosage (ppm) | Turbidity (NTU) |
|---|---|---|
| 2 | 2 | 2.5 |
| 3 | 1.5 | 3.1 |
| 4 | 1.5 | 2.3 |
| Control | — | 5.5 |

As demonstrated in Table III, copolymers of 5 and 10 weight percent alginic acid with both AETAC and DMAPMAM were effective at reducing turbidity in the test substrate.

TABLE IV

Residual Turbidity/Color Test Water Substrate II
Synthetic river water, turbidity = 15 NTU, true color = 308 cu

| Example | Dosage (ppm) | Turbidity (NTU) | True Color (cu) |
|---|---|---|---|
| 1 | 10 | 4.8 | 27 |
| 2 | 10 | 2.7 | 25 |
| Alginic acid | 10 | 11.8 | — |
| Control | — | 12.4 | 291 |

As demonstrated in Table IV, the inventive copolymers were more effective at reducing turbidity than a low molecular weight polysaccharide, alginic acid.

TABLE V

Residual Turbidity Test Water Substrate III
Synthetic river water turbidity, = 90 NTU

| Example | Dosage (ppm) | Turbidity (NTU) |
|---------|--------------|-----------------|
| 1 | 16 | 0.9 |
| 2 | 16 | 0.6 |

TABLE VI

Residual Turbidity Test Water Substrate IV
Catawba River water, turbidity = 3.5 NTU

| Example | Dosage (ppm) | Turbidity (NTU) |
|---------|--------------|-----------------|
| 1 | 8 | 1.9 |
| 2 | 4 | 1.6 |

As demonstrated in Tables V and VI copolymers of alginic acid and AETAC were effective at reducing turbidity of the test substrates.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for reducing the turbidity of an aqueous system comprising adding to said system an effective amount for that purpose of a water soluble or dispersible copolymer of alginic acid with methyl chloride quaternary salt of dimethylaminoethyl acrylate as a cationic monomer, said copolymer is produced by the process comprising mixing a sufficient amount of an alginic acid and said cationic monomer in an aqueous phase to form an aqueous solution, polymerizing said monomers at a temperature of about 10° to 100° C. and a pH of about 5.0 to 9.0 in the presence of a free radical initiator, wherein the resulting copolymer has a weight percent of said cationic monomer from about 50 to about 99%.

2. The method as claimed in claim 1 wherein said alginic acid has a molecular weight of about 50,000 to about 250,000.

3. The method as claimed in claim 1 wherein the weight percent of said methyl chloride quaternary salt of dimethylaminoethyl acrylate is about 90 to about 95%.

4. The method as claimed in claim 1 wherein said copolymer is added to said aqueous system in an amount ranging from about 0.1 to about 100 parts per million parts of said system.

5. A method for reducing the color of an aqueous system comprising adding to said system an effective amount for that purpose of a water soluble or dispersible copolymer of alginic acid with methyl chloride quaternary salt of dimethylaminoethyl acrylate as a cationic monomer, said copolymer is produced by the process comprising mixing a sufficient amount of an alginic acid and said cationic monomer in an aqueous phase to form an aqueous solution, polymerizing said monomers at a temperature of about 10° to 100° C. and a pH of about 5.0 to 9.0 in the presence of a free radical initiator, wherein the resulting copolymer has a weight percent of said cationic monomer from about 50 to about 99%.

6. The method as claimed in claim 5 wherein said alginic acid has a molecular weight of about 50,000 to about 250,000.

7. The method as claimed in claim 5 wherein the weight percent of said methyl chloride quaternary salt of dimethylaminoethyl acrylate is about 90 to about 95%.

8. The method as claimed in claim 5 wherein said copolymer is added to said aqueous system in an amount ranging from about 0.1 parts to about 100 parts per million parts of said system.

9. A water soluble or dispersible copolymer composition comprising a copolymer of alginic acid with methyl chloride quaternary salt of dimethylaminoethyl acrylate as a cationic monomer, said copolymer is produced by the process comprising mixing a sufficient amount of an alginic acid and said cationic monomer in an aqueous phase to form an aqueous solution, polymerizing said monomers at a temperature of about 10° to 100° C. and a pH of about 5.0 to 9.0 in the presence of a free radical initiator, wherein the resulting copolymer has a weight percent of said cationic monomer from about 50 to about 99%.

10. The composition as claimed in claim 9 wherein said alginic acid has a molecular weight of about 50,000 to about 250,000.

11. The composition as claimed in claim 9 wherein the weight percent of said methyl chloride quaternary salt of dimethylaminoethyl acrylate is about 90 to about 95%.

12. A process for producing a water soluble or dispersible copolymer of alginic acid with methyl chloride quaternary salt of dimethylaminoethyl acrylate as a cationic monomer comprising: mixing a sufficient amount of an alginic acid and said cationic monomer in an aqueous phase to form an aqueous solution, polymerizing said monomers at a temperature of about 10° to 100° C. and a pH of about 5.0 to 9.0 in the presence of a free radical initiator, wherein the resulting copolymer has a weight percent of said cationic monomer from about 50 to about 99%.

13. The process as claimed in claim 12 wherein the polymerization temperature is 40° to 70° C.

14. The process as claimed in claim 12 wherein said initiator is selected from the group consisting of 2,2'-azobis(2-amidinopropane) dihydrochloride and t-butylhydroperoxide/sodium metabisulfite.

* * * * *